United States Patent
Oberg et al.

(10) Patent No.: US 8,943,488 B2
(45) Date of Patent: Jan. 27, 2015

(54) VIDEO GAME FORWARD COMPATIBILITY INCLUDING SOFTWARE PATCHING

(75) Inventors: Gregory Keith Oberg, Troy, NY (US); Jesse Nathaniel Booth, Schoharie, NY (US)

(73) Assignee: Activision Publishing, Inc., Santa Monica, CA (US)

(*) Notice: Subject to any disclaimer, the term of this patent is extended or adjusted under 35 U.S.C. 154(b) by 1248 days.

(21) Appl. No.: 11/967,969

(22) Filed: Dec. 31, 2007

(65) Prior Publication Data

US 2009/0172659 A1   Jul. 2, 2009

(51) Int. Cl.
*G06F 9/445* (2006.01)
*A63F 13/00* (2014.01)

(52) U.S. Cl.
CPC .......... *A63F 13/00* (2013.01); *A63F 2300/204* (2013.01); *A63F 2300/209* (2013.01); *G06F 8/65* (2013.01); *A63F 2300/405* (2013.01)
USPC .......... 717/168; 717/169; 717/170; 717/171; 717/173; 717/178

(58) Field of Classification Search
USPC ........................................................ 717/178
See application file for complete search history.

(56) References Cited

U.S. PATENT DOCUMENTS

| | | | |
|---|---|---|---|
| 5,806,849 A | | 9/1998 | Rutkowski |
| 6,198,946 B1 | | 3/2001 | Shin et al. |
| 6,334,815 B2 * | 1/2002 | Miyamoto et al. ............... 463/43 |
| 6,353,174 B1 | 3/2002 | Schmidt et al. |
| 6,482,087 B1 | 11/2002 | Egozy et al. |
| 6,544,126 B2 * | 4/2003 | Sawano et al. .................. 463/42 |
| 6,757,517 B2 | 6/2004 | Chang |
| 6,779,004 B1 | 8/2004 | Zintel |
| 6,996,817 B2 | 2/2006 | Birum et al. |
| 7,069,452 B1 | 6/2006 | Hind et al. |
| 7,143,939 B2 | 12/2006 | Henzerling |
| 7,236,739 B2 | 6/2007 | Chang |
| 7,251,812 B1 | 7/2007 | Jhanwar et al. |
| 7,275,994 B2 | 10/2007 | Eck et al. |
| 7,293,201 B2 | 11/2007 | Ansari |
| 7,305,672 B2 | 12/2007 | Vincent |
| 2002/0169014 A1 | 11/2002 | Egozy et al. |
| 2004/0093592 A1 * | 5/2004 | Rao ............................... 717/168 |
| 2004/0120001 A1 * | 6/2004 | Boldon ......................... 358/1.15 |
| 2004/0127254 A1 * | 7/2004 | Chang ........................... 455/557 |
| 2007/0136297 A1 * | 6/2007 | Choe .............................. 707/10 |
| 2007/0243915 A1 | 10/2007 | Egozy et al. |
| 2007/0245881 A1 | 10/2007 | Egozy et al. |
| 2008/0133650 A1 * | 6/2008 | Saarimaki et al. ............. 709/203 |
| 2008/0141018 A1 * | 6/2008 | Tanaka et al. ..................... 713/2 |

OTHER PUBLICATIONS

"Game Boy Advance Wireless Adapter" 1 page, Jan. 29, 2005.
"Nintendo DS Lite", Instruction Booklet, Nintendo of America Inc., 2006, 15 pages.

* cited by examiner

*Primary Examiner* — Li B Zhen
*Assistant Examiner* — Joanne Macasiano
(74) *Attorney, Agent, or Firm* — Klein, O'Neill & Singh, LLP

(57) ABSTRACT

Methods for updating video game software or handheld game devices, and systems for performing the methods. In some embodiments a first handheld game device with a later version of a game update software of a second handheld game device with an earlier version of the game.

15 Claims, 5 Drawing Sheets

VIDEO GAME FORWARD COMPATIBILITY INCLUDING SOFTWARE PATCHING

BACKGROUND OF THE INVENTION

The present invention relates generally to handheld video game devices and more particularly to provision of video game information from one handheld game device to another handheld game device over a wireless connection.

Video games allow users to enjoy interactive displays, engage in competitive interaction, and engage in scenarios and simulated activities which they would not otherwise be able to experience. Video games are a source of enjoyment for millions of users across the world.

Handheld video game devices are at times the video game platform of choice due to their mobility and convenience. Handheld video game devices provide a relatively small platform on which to enjoy video game play, allowing for easy transport and ease of play in many environments unsuitable for video game play on more traditional video game consoles or arcade machines.

Specific video game programs for handheld video game devices are generally provided on a removable memory source. The video game device processes video game program instructions stored on the removable memory source to provide video game play.

Many handheld video game devices have wireless communication capabilities. The wireless communication capabilities may be utilized, for example, to quickly and conveniently communicate game play information between two or more handheld video game devices for competitive game play, allowing for multiplayer game play. The wireless communication capabilities may also be convenient for providing video game data or other video game information from one handheld video game device to another. Indeed, programs instructions for an entire video game may be wirelessly connected from one handheld device to another handheld device. For a variety of reasons, however, it may be preferable for each handheld device to have a video game program resident on a removable memory source.

Often, however, the same or substantially same video game may be available in different versions, with different handheld devices potentially having different versions of a video game. Compatibility issues between the different versions may result in difficulties in multiplayer game play, whether by not providing full use of features of a game or by being unable to provide multiplayer game play at all.

SUMMARY OF THE INVENTION

The invention provides for sending video game updates over a wireless connection for, for example, handheld video game devices. In one aspect, a method of updating handheld device video game software, comprising determining a version of a game on a handheld device, determining information to update the version of the game on the handheld device, and commanding the handheld device to write the information to memory of the handheld device so as to modify the game on the handheld device.

In another aspect a handheld game device configured to perform software patching of video game software of another handheld device, comprising a processor, wireless communication circuitry, memory including program instructions to configure the processor to determine information to provide to another handheld game device in order to modify video game software of the other handheld device.

These and other aspects of the invention are more fully comprehended upon review of this disclosure.

DETAILED DESCRIPTION

Figure 1:
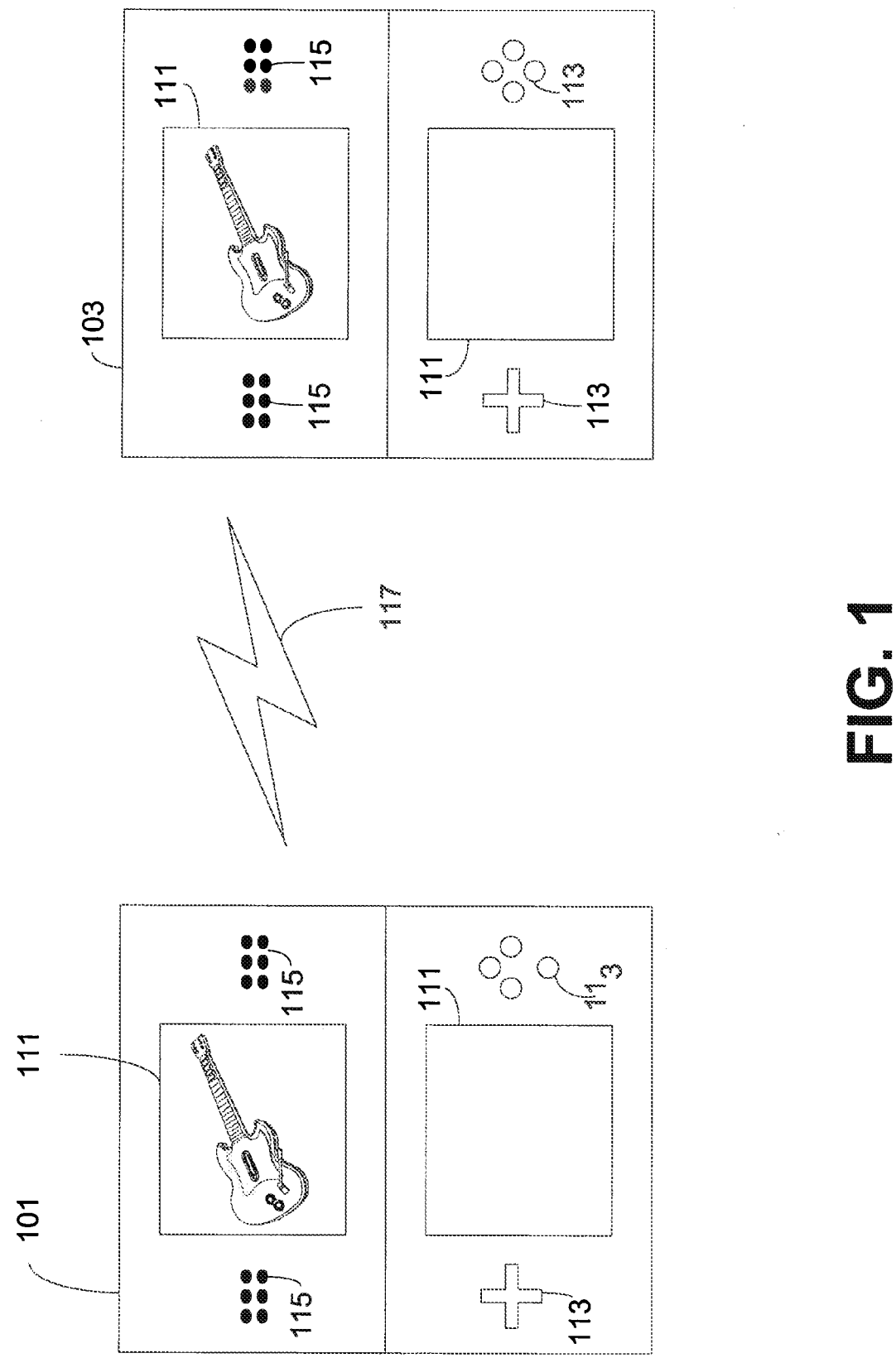
FIG. 1 illustrates an embodiment of a multiplayer handheld video game configuration.

FIG. 1 illustrates an embodiment of a multiplayer handheld video game configuration. The configuration includes a first handheld video game device 101 and a second handheld video game device 103. Each handheld video game device includes at least one display 111 (with two displays per device shown in FIG. 1), at least one user input device 113, and, as illustrated, at least one speaker 115. Each device includes circuitry generally associated with video game devices, such as circuitry for reading a removable memory, processing circuitry for executing game instructions stored in the removable memory, circuitry for driving the display, circuitry for driving the speaker, and circuitry for receiving user inputs. In addition, each device includes circuitry for wireless communication 117 between the devices. In some embodiments, the handheld devices are Nintendo DS handheld video game devices or Nintendo DS Lite handheld video game devices, both widely available in consumer electronics retail stores.

Generally, for standalone game play, the first handheld device 101 and the second handheld device 103 are both provided with a removable memory, such as provided by a game cartridge. The removable memory will include, for example, video game instructions and other data related to running the game on the handheld device, such as display or audio information for use as part of or in conjunction with the video game.

As shown in FIG. 1, the first handheld device 101, and the second handheld device 103 are in wireless communication 117. The devices may be in wireless communication during multiplayer game play. For example, video game information used for multiplayer interaction, for example, synchronization information, user input information, and score or statistical information, may be transmitted wirelessly between the two handheld devices to create an interactive multiplayer game environment. In various embodiments, these wireless transmissions may occur between a plurality of other handheld devices. Thus, in such embodiments, the interactive multiplayer game play may be between more than two handheld devices.

In some instances, the removable memory, such as a video game cartridge, in the first handheld device 101 may differ slightly from the removable memory in the second handheld device 103. The differences may be such that the two handheld devices are incapable of providing multiplayer game environment, or incapable of providing an intended or desired multiplayer game environment. For example, the removable memory in the first handheld device may contain an older version of a video game than the removable memory in the second handheld device, may be for a newer generation, for example a sequel, of the video game in the removable memory in the second handheld device. Alternatively, the video game in the removable memory in the second handheld device may contain a bug not present in the memory of the first handheld device. In such and other cases, inconsistencies in data or program instructions may cause one of the handheld devices to be unable to fully or partially process game information.

For example, variations in versions, iterations, or generations of the same video game may result in inconsistencies in data or data formats, resulting in improper game operation. Likewise, bugs or problems in software of a particular version of a video game data may hinder multiplayer interactivity as well. The inconsistencies between the video game information may be with respect to, for example, character animations and models, venue animation and models, textures, and game play data such as user instruction information, such as music note data in music games, and animation tracks.

In some embodiments, the first handheld device wirelessly communicates 117 software patches to the second handheld device 103, as seen in FIG. 1. The software patches may be program instructions or data to be operated on by program instructions. In most embodiments the software patches include information to replace or supplement program instructions or data already resident in memory of the second handheld device. For example, in some embodiments the second handheld device provides an indication of software version to the first handheld device. The first handheld device determines software patches to provide to the second handheld device based on the version information. The first handheld device retrieves appropriate information from its own removable memory or on board memory, and provides, via wireless transmission, software patches to the second handheld device.

Thus, for example, a removable memory in the second handheld device 103 has an older generation of video game software, and a removable memory in the first handheld device 101 has a newer generation of video game software, for example. a sequel of the older generation video game software. The second handheld device may communicate version information to the first handheld device over, for example, a wireless connection 117 as seen in FIG. 1. The first handheld device may determine, for example using a look-up table, software code, components, or data to be patched or replaced in the second handheld device to properly enable multiplayer game play. The first handheld device retrieves replacement information from memory, for example from a game cartridge containing a video game program, and patches or replaces the identified software components in the removable memory of the first handheld device by wirelessly transmitting the patches or replacement software components to the first handheld device, preferably along with instruction information as to storage locations for the replacement information.

After multiplayer game play is complete, in some embodiments, or upon some other predefined occurrence, the patched or updated video game information is maintained in the second handheld device memory, or stored in the removable game cartridge of the second handheld device. This may be preferable, for example, if the removable memory in the second handheld device holds video game information that is later discovered to include a bug or inconsistency in the video game software which could use a software upgrade to function correctly. In other embodiments, the patched or updated video game information on the removable memory in the first handheld device is deleted or overwritten after the multiplayer connection 117 is terminated.

Preferably, each new version or generation of a video game will include information as to what to replace or fix for prior versions or generations to enable forward compatibility for, for example, multiplayer game play. Each new version or generation of a video game preferably includes information to determine whether patches or updates sent to the older version or generation video game software should be a permanent write to the older version or generation video game software or merely a temporary write used during an instance of multiplayer game play. These tasks may be accomplished by, for example, identification of version or generation information of a recipient video game cartridge, and determining which bytes of the recipient video game software should be patched or updated and whether the patches or updates should be made permanent based on the version or generation of the recipient video game cartridge.

Figure 2:
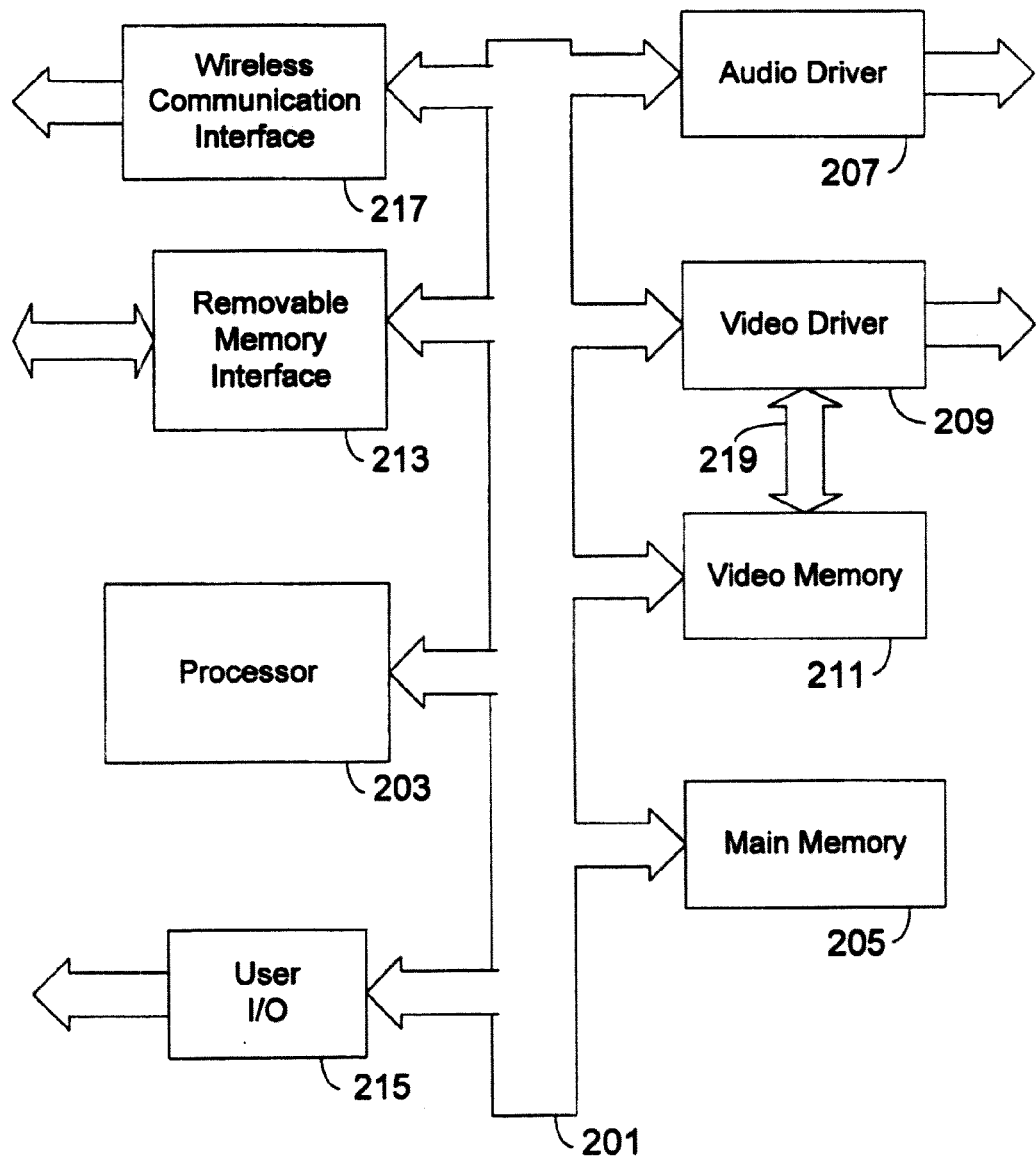
FIG. 2 is a block diagram of a handheld game device.

FIG. 2 is an example of a block diagram of, for example, a handheld device in accordance with one embodiment of the invention. The handheld game device includes a bus 201 coupled to a processor 203, a main memory 205, an audio driver 207, a video driver 209, a video memory 211, a removable memory interface 213, a user input/output (I/O) interface 215, and a wireless communication interface 217. In some embodiments, there may be multiple processors, with each processor having separate data buses. In this embodiment, the video driver is coupled directly to the video memory via a dedicated bus 219.

The removable memory interface 213 is configured to communicate with a removable memory, for example, a video game cartridge providing specific video game instructions, and storage and memory commands related to the operation of that specific video game. The processor 203 is configured to communicate with the removable memory through the removable memory interface, and execute the video game instructions from the removable memory by communicating with each component coupled to the bus 201, including the removable memory. The main memory 205 stores information from the other components as needed. The main memory can store information such as, for example, video game play instructions, audio information, video information, and configuration information from the removable memory, and user inputs from the user I/O interface 215. Among the video game instructions stored from the removable memory are also instructions on how to interpret user inputs from the user I/O interface in relation to the specific video game. The processor adjusts the video game's audio and video properties according to the user inputs based on these instructions. The audio driver 207 is configured to receive audio information from the bus and to translate that information into audio signals to be provided to audio output devices such as speakers. The video driver 209 is configured to receive video information and to translate that information into video signals to be provided to video output devices such as one or more video screens or monitors. The video driver is configured to receive this video information from either a component connected to it through the main bus, or from a video memory 211 which is dedicated to store video information for the specific game. The handheld device may also communicate wirelessly with other handheld devices or other computing devices through the wireless communication interface 217. The wireless communication interface will be controlled by commands from the processor based on instructions read from either the removable memory or the main memory.

Figure 3:
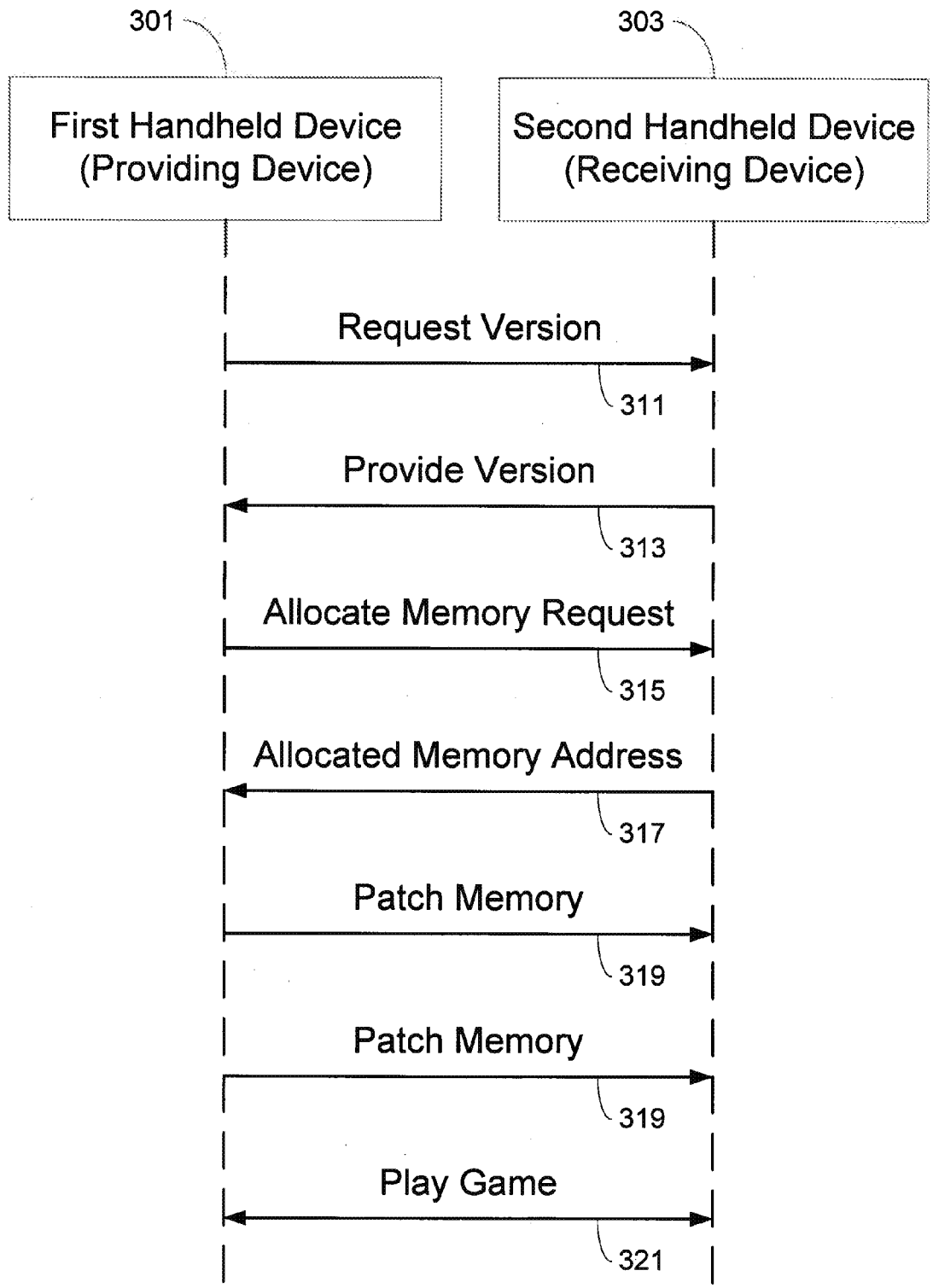
FIG. 3 is a sequence diagram showing data transfer interactions between handheld devices in accordance with aspects of the invention.

FIG. 3 is a sequence diagram representing the interaction between a first handheld device 301 and a second handheld device 303 in accordance with embodiments of the invention. The interaction may be, for example, the multiplayer interaction discussed with respect to FIG. 1, where the video game on the removable memory in a second handheld device is an older version or generation than the video game on the removable memory in a first handheld device. After a wireless connection is made and before multiplayer game play begins, the first handheld device requests the version or generation of the video game on the removable memory in the second handheld device. This version request is indicated by communication 311. The second handheld device provides the version or generation information of the video game on the removable memory in the second handheld device to the first handheld device during communication 313. The first handheld device compares the version or generation of the video game used by the second handheld device with the version or generation of its own video game. It should be noted that generally both devices will inquire about version information from the other device, but for ease of discussion only one such inquiry is specifically shown in FIG. 3.

The first handheld device may be considered a providing device, for example with the video game information on the removable memory in the first handheld device being a newer version or generation than the video game information on the removable memory in the second handheld device. In such an instance, for example, the second handheld device may be considered a receiving device. The providing device assesses version information, for example, from the receiving device and, based on that information and information from the removable memory of the providing device, the providing device provides update information to the receiving device. This may be the case where, for example, the update information will generally be specific to the version or generation of the video game software used by the receiving device.

In some embodiments, the size of the bytes of data to write to the receiving device will match the size of the bytes of data to be replaced on the receiving device. In such embodiments, allocation of extra space for data may not be necessary. In other embodiments, the size of the bytes of data to write to the video game software of the receiving device may not match the size of the bytes of data to be replaced on the video game software of the receiving device. In such embodiments, the providing device will send an allocate memory request communication 315 to the receiving device to request allocation of memory to store the update information onto the receiving device.

After receiving an allocate memory request 315, the receiving device determines where on the receiving device to allocate memory for the update information. In some embodiments, the receiving device allocates memory in device memory for receipt of the update information from the providing device. In some embodiments device memory of the receiving device may include flash memory, and the allocated memory may be in flash memory. Allocation of device memory, for example instead of in removable memory inserted into the device, may be appropriate when, for example, the write information is not to be kept permanent, and the newly allocated memory will be freed on disconnect from multiplayer interaction. In other embodiments, the receiving device allocates memory in the removable memory holding the video game software. This may be appropriate when, for example, the video game software used by the receiving device was initially programmed with allocated memory for forward compatibility purposes, or for example, the update information is to be a permanent patch or upgrade for the video game software used by the receiving device.

The receiving device sends an address representing the location of allocated memory to the providing device via communication 317. In one embodiment, the receiving device may send a plurality of allocated memory addresses to the providing device. Thus, in some embodiments, the providing device may have more than one memory location on the receiving device available to which to write information.

The providing device uses a patch memory command 319 to send the update information to the receiving device. In some embodiments, the patch memory command includes instructions for the number of bytes to allocate for the information, the memory address location to write the patched or updated data, the data, and a flag indicator. The flag indicator indicates whether to permanently apply the patch or update to the video game software of the receiving device, or to remove the patch or update upon disconnect of multiplayer interaction. In various embodiments, the providing device may send a plurality of patch memory commands to the receiving device. Such embodiments would be appropriate, for example, where more than one section of the video game software of the receiving device is patched or updated by the providing device.

It should also be noted that in some embodiments the providing device uses the patch memory command without first making use of the request for memory allocation or receiving an allocated memory address. For example, the providing device may already have sufficient information to be able to specify a memory address.

Once the patch memory commands 319 have been executed, and the video game software of the receiving device is successfully patched or updated to be forward compatible with the video game software of the providing device, the providing device and the receiving device wirelessly communicate with each other for multiplayer game play using communications 321. Once multiplayer game play ends, and the multiplayer wireless connection between the providing device and receiving device is terminated, the receiving device utilizes the flag indicators of each patch command to determine whether to make the software patch or update associated with each patch command permanent, or whether to remove the patch or update and revert the video game software back to the state prior to initiating the multiplayer connection.

Figure 4:
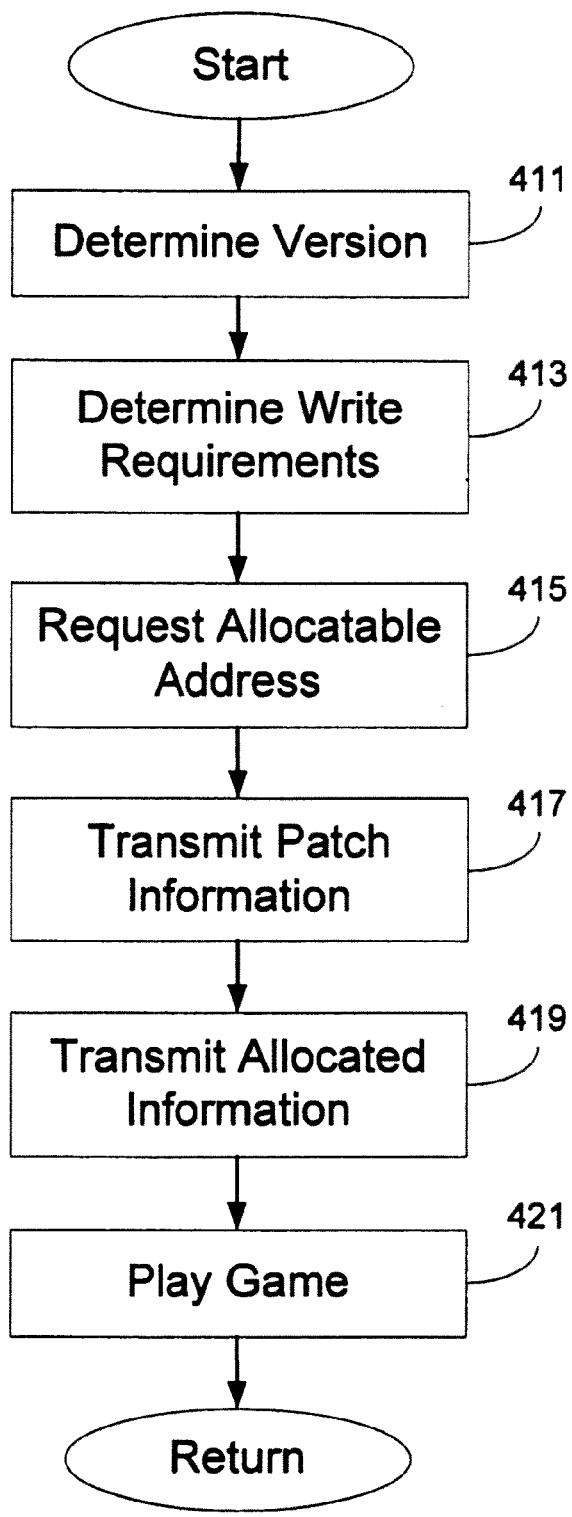
FIG. 4 is a flow diagram of a process of providing software patches in accordance with aspects of the invention.

FIG. 4 is a flow diagram of a process of sending forward compatibility information from a providing handheld device in accordance with aspects of the invention. In some embodiments, the process may be performed, for example, by the first handheld device of FIG. 1 or the providing device of FIG. 3. In block 411, the process determines the version or generation of the video game software being used by the receiving device. In many embodiments, this determination is performed by receiving game version information from the receiving device. In some embodiments game version information is received from the receiving handheld after the process requests game version information from the receiving device. In other embodiments the receiving device automatically provides game version information, for example as part of establishing communications between handheld devices.

In block 413, the process determines update information to provide to the receiving device. The update information may, for example, be used to modify video game software of the receiving device so as to provide for compatibility of video game software. In some embodiments, the process determines update information by referencing a table, for example stored in memory of the providing device, for changes appropriate for the particular version or generation of the video game software of the receiving device. The table may include, for example, information indicating bytes to be written over specific memory in the video game software of the receiving device. The table may also include, for example, information on the amount of allocated memory to be utilized on the other handheld device, and the bytes to be written to the allocated memory.

In block 415, the process requests allocatable addresses of memory on the receiving device. Generally, the allocatable addresses are for the purpose of allowing the process to command writes of information to appropriate address space of the receiving device where the software patches or upgrades required for forward compatibility may be stored. In some embodiments, separate allocations may be requested for each separate patch or update. In other embodiments, a request for an allocation sufficient to store all the patches together may be sent from the providing device to the receiving device. Although not shown as a separate block, the process generally receives allocated addresses from the receiving device.

In block 417, the process transmits patch information to the receiving device. In some embodiments, patch information represents information to be written to specific memory of the video game software on the receiving device, overwriting video game instructions and bytes which are to be replaced preferably to provide increased function or interoperability for multiplayer game play. In other embodiments, patch information represents information redirecting a processor of the receiving device to process bytes of information, program instructions and/or data in various embodiments, at one or more of the allocated addresses.

In block 419, the process transmits allocated information to the receiving device. In some embodiments, allocated information represents bytes of software information meant to replace older versions of the same software information, to achieve forward compatibility for example, where the space required to hold the new software information exceeds the space available at the memory location where the old software information was held. In other embodiments, allocated information represents bytes of information including a flag indicating the removal of the bytes of information after the wireless connection for multiplayer game play is terminated. In various embodiments, allocated information represents specific instructions to which associated patch information redirects the processor of the other handheld device, to achieve forward compatibility for example. Allocated information can be transmitted, for example, before or after patch information.

In block 421 the process engages in multiplayer game play. When multiplayer game play ends, the process returns.

Figure 5:
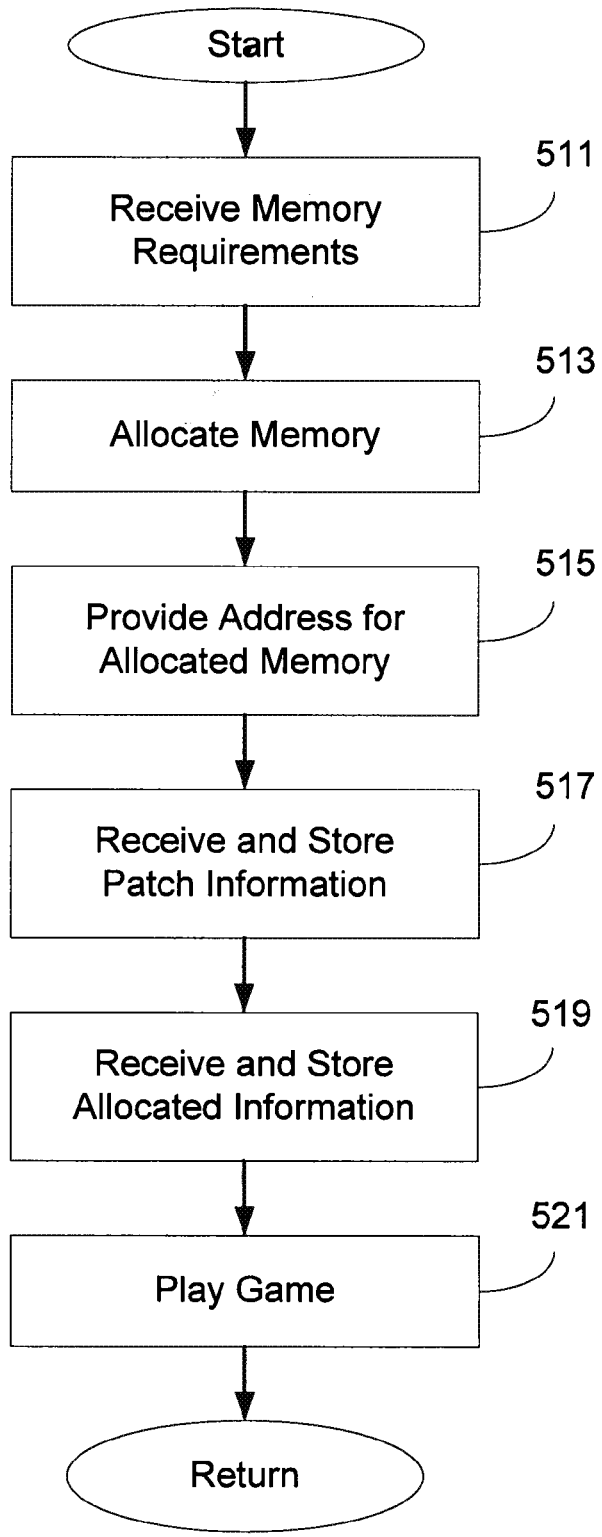
FIG. 5 is a flow diagram of a process of receiving software patches in accordance with aspects of the invention.

FIG. 5 is a flow diagram of a process of receiving information, for example forward compatibility information, in accordance with aspects of the invention. In some embodiments, the process may be performed, for example, by the wireless communications system of FIG. 1, and more particularly by a receiving device of the system of FIG. 3. In many embodiments, the process initially includes providing version information of video game software. In block 511, the process receives a memory allocation request from another handheld device, such as the providing handheld device of FIG. 3. In some embodiments, the request may ask for the byte size allocation of addresses with preexisting bytes of information to be overwritten in the video game software used by the receiving device. In other embodiments, the requests may ask for allocations of free space available on the receiving device. In yet other embodiments, the requests may contain both overwrite requests and free space allocation requests.

In block 513, the process allocates memory. The memory is allocated for writing of information as requested by the providing device. In some embodiments, allocating memory includes determining free space available on memory of a handheld device performing the process. In some embodiments allocating memory includes determining free space available on removable memory used by the handheld device performing the process. If there is not enough space on the removable memory, or if, for example, the request from the providing device indicates a temporary change which will be removed after multiplayer game play is complete, the required memory space may alternatively be allocated on the main memory of the receiving device. In some embodiments the receiving device may back up the bytes of information to be overwritten at another location before allocating the requested memory address. Thus, if reversion is appropriate after multiplayer game play is complete, the original bytes of information can be easily restored onto the memory of the handheld device.

The process provides memory address locations on either the main memory or the removable memory for the allocated memory, and transmits the addresses to the other handheld device in block 515. In some embodiments, the information provided and transmitted by the handheld device may only include starting addresses and byte size information. In some embodiments, the addresses of the allocated memory may be paired with information on the specific patch or update to be stored in that particular allocated memory.

In block 517, the process receives patch information from the providing device. In some embodiments, this patch information overwrites original bytes of information in the video game software used by the handheld device. These bytes of information may have been identified by the providing device as information which should be patched or updated to enable multiplayer game play. In other embodiments, patch information received redirects the processor of the receiving device to process bytes of information at one or more of the allocated addresses holding new video game instructions. This may be done, for example, where the byte size of the patch or update exceeds the byte size available at the memory location where the old software information to be replaced was held.

In block 519, the process receives allocated information from the providing device. Allocated information may represent, for example, bytes of information including a flag indicating the removal of the bytes of information after the wireless connection for multiplayer game play is terminated. Allocated information may also represent, for example, specific video game software instructions to which associated patch information redirects the processor to achieve forward compatibility. Such information may be stored in separate allocated memory rather than overwrite specific memory because, for example, the size of the replacement information is too large to store in the memory address of the information to be replaced. In another embodiment, information may be stored in allocated memory rather than over write original video game software when the changes are not meant to be permanent, and will be deleted upon completion of multiplayer game play. Some portions of the allocated information received may be stored in the removable memory used by the receiving device, while other portions of the allocated information received may be stored, possibly simultaneously, in the main memory of the receiving device. Allocated information can be received from the providing device, for example, before, after, or simultaneously with patch information.

In block 521 the process engages in multiplayer game play. When multiplayer game play ends the process returns. In most embodiments any flags indicating portions of video game software information to be reverted to the original version of software will be honored, and the video game will be able to function for standalone game play. Upon another multiplayer connection attempt, the forward compatibility process may be reinitiated.

Accordingly, aspects of the invention provide for software patching and forward compatibility of video game software of handheld game devices. Although the invention has been discussed with respect to certain embodiments, it should be recognized that the invention may be practiced other than as specifically described, the invention comprising the claims and their insubstantial variations supported by this disclosure.

What is claimed is:

1. A method of updating handheld device video game software, comprising:
   determining, by a second handheld device, a version of video game software stored on a first handheld device;
   determining, by the second handheld device, information to update portions of the video game software version of the game on the first handheld device to make the video game software on the first handheld device forward compatible with a version of the video game software on the second handheld device to allow for multiplayer game play between the first and second handheld devices, based at least on a version of video game software of a game stored on the second handheld device;
   transmitting the information to update the video game software version of the game from the second handheld device to the first handheld device along with instructions as to where in memory of the first handheld device to store the information, the instructions including at least one memory address for storage of the information in the first handheld device and at least one flag indicating removal of the information after termination of multiplayer game play;
   commanding the first handheld device to write the information to memory of the first handheld device in accordance with the received instructions, so as to modify the video game software on the first handheld device; and
   communicating, by the second handheld device, with the first handheld device for multiplayer game play.

2. The method of claim 1 further comprising deleting the information from the first handheld device after termination of multiplayer game play in accordance with the at least one flag.

3. The method of claim 1 further comprising requesting a memory allocation from the first handheld device, receiving at least one memory address of allocated memory from the first handheld device, and wherein the at least one memory address for storage of the information includes the at least one memory address of allocated memory.

4. The method of claim 1 wherein the information to update the video game software version of the game comprises program instructions for use in execution of the game by the first handheld device.

5. The method of claim 1 wherein the information comprises data for use by program instructions.

6. A handheld game device configured to perform software patching of video game software of another handheld device, having a different version of the video game software, in wireless communication with the handheld game device, comprising:
   a processor;
   wireless communication circuitry;
   memory including program instructions to configure the processor to determine information to provide to another handheld game device in order to modify a portion of video game software of the other handheld device based on a version of video game software of the handheld game device so as to make the older version of the video game software of the other handheld device forward compatible for multiplayer game play with video game software stored on the handheld device to allow for multiplayer game play between the handheld device and the other handheld device, wherein the other handheld device has an older version of the same video game software stored thereon as compared to the video game software stored on the handheld device;
   wherein the memory further includes program instructions to provide the information to the other handheld game device using the wireless communication circuitry; and
   wherein the program instructions to provide the information to the other handheld game device using the wireless communication circuitry includes program instructions to provide the information and to provide at least one memory address of memory of the other handheld game device to which the other handheld game device should write the information and at least one flag indicating removal of the information after termination of multiplayer game play.

7. The handheld game device of claim 6 wherein the program instructions to provide the information to the other handheld game device using the wireless communication circuitry includes program instructions to provide a retention flag as to retention of the information in memory to the other handheld game device.

8. The handheld game device of claim 6 wherein the memory further includes program instructions to request an allocation of memory from the other handheld game device.

9. The handheld game device of claim 6 wherein the information includes program instructions.

10. The handheld game device of claim 6 wherein the information includes program instructions to replace program instructions of the video game software of the other handheld game device.

11. The handheld game device of claim 10 wherein the program instructions are to replace some but not all of the program instructions of the video game software of the other handheld game device.

12. A method including updating handheld device video game software, comprising:
    determining, by a first handheld device, a version of video game software stored on a second handheld device;
    determining, by the first handheld device, information to update portions of the video game software version of the game on the second handheld device to make the video game software version of the game on the second handheld device forward compatible with video game software stored on the first handheld device to allow for multiplayer game play between the handheld devices, based at least on a version of video game software of a game stored on the first handheld device, the information including program instructions;
    transmitting, from the first handheld device to the second handheld device, at least one memory address identifying a location in memory of the second handheld device for storage of at least some of the information;
    transmitting the information, including the program instructions, to update the video game software version of the game from the first handheld device to the second handheld device along with at least one flag indicating removal of information after termination of multiplayer game play;
    engaging, by the first and second handheld devices, in multiplayer game play; and deleting at least some of the information from the second handheld device in accordance with the at least one flag after completion of multiplayer game play.

13. The method of claim 12, wherein the at least one memory address is a memory address provided to the first handheld device from the second handheld device.

14. The method of claim 12, wherein the program instructions include program instructions which replace program instructions resident in memory of the second handheld device.

15. The method of claim 12, wherein the program instructions include program instructions which supplement program instructions resident in memory of the second handheld device.

* * * * *